R. GRAY,
Assignor of one-half to H. O. BERNARD.
HEAD COVERING.
No. 9,928. Reissued Nov. 15, 1881.
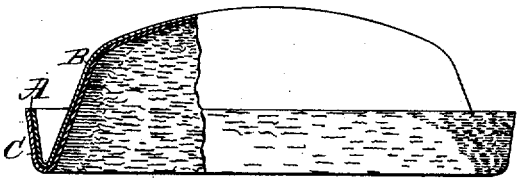
WITNESSES:
W. L. Bennem.
J. W. Ripley
Robert Gray INVENTOR:
per Baldwin, Hopkins, & Peyton.
ATTORNEYS.
N. PETERS, Photo-Lithographer, Washington, D. C.

UNITED STATES PATENT OFFICE.

ROBERT GRAY, OF NEW YORK, ASSIGNOR OF ONE-HALF INTEREST TO HENRY O. BERNARD, OF BROOKLYN, N. Y.

HEAD-COVERING.

SPECIFICATION forming part of Reissued Letters Patent No. 9,928, dated November 15, 1881.

Original No. 219,462, dated September 9, 1879. Application for reissue filed October 21, 1881.

*To all whom it may concern:*

Be it known that I, ROBERT GRAY, of the city, county, and State of New York, have invented a new and useful Improvement in Head-Coverings, which improvement is fully set forth in the following specification, reference being had to the accompanying drawing, which represents a sectional side view of a hat embodying my invention.

This invention relates to the manufacture of hats, bonnets, or other head-coverings with a top layer of flock.

Hats of this description have been made by applying the flock to a buckram support, but have invariably been stiff, owing to the fact that in order to give the article the required body or strength it was necessary to use a heavy or thick piece of buckram. One objection to this hat is the stiffness referred to, it being desirable in some cases to furnish a soft hat, and another the visibility of the buckram tending to defeat the object of the flock layer, which is to produce a felt-like article.

My invention is a head-covering consisting of a support of buckram or the like, a top layer of flock, and a canton-flannel or other similar lining, whereby the article is rendered capable of taking a soft finish, while both surfaces thereof have the appearance or semblance of felt—one of plain felt and the other of napped felt.

In the drawing, the letter A designates the support; B, the flock layer; and C the canton-flannel or other similar lining.

In carrying out my invention I first cement the lining C to a piece of buckram or like fabric by a suitable adhesive substance, with the nap of the lining exposed, and then press the two together, in any usual or suitable manner, to the desired shape. In lieu of canton-flannel the fabric known as "glove-lining" may be used. I now apply to the buckram a layer of cotton, wool, or other flock, this process consisting in coating the buckram with an adhesive substance and strewing the flock thereon in finely-powdered form. The article is then in a state for trimming.

The buckram A supports both the flock layer B and the lining C, and, being re-enforced by the lining, a light or thin piece of such material may be used, rendering the article pliable or soft, substantially like soft felt. The appearance of the article, moreover, is felt-like, inasmuch as the lining has the semblance of napped felt, and the flock layer that of plain felt.

By my invention I get two important results in the manufacture of head-coverings: First, by combining the lining with thin buckram I get a napped felt-like surface, with sufficient body and flexibility in the combined or compound fabric. Second, by combining flock with the thin buckram and attached lining I get as a further result the combination, with the thin buckram, of a plain felt-like surface and a napped felt-like surface, with sufficient body and flexibility in the head-covering. In other words, a thoroughly felt-like article.

What I claim as new, and desire to secure by Letters Patent, is—

1. A head-covering consisting of a support of buckram or the like, a top layer of flock, and a canton-flannel or other similar lining, substantially as and for the purpose described.

2. A head-covering lined in semblance of napped felt, with nap-exposed canton-flannel or the like, substantially in the manner described.

ROBERT GRAY.

Witnesses:
S. J. GORDON,
JOHN W. RIPLEY.